March 22, 1949.  A. GORDON  2,464,976
WASTE TRAP

Filed April 30, 1945  2 Sheets-Sheet 1

Inventor:
Arthur Gordon,
By Chritton, Wiles, Schroeder,
Merriam & Hofgren, Attys.

March 22, 1949.  A. GORDON  2,464,976
WASTE TRAP
Filed April 30, 1945  2 Sheets-Sheet 2
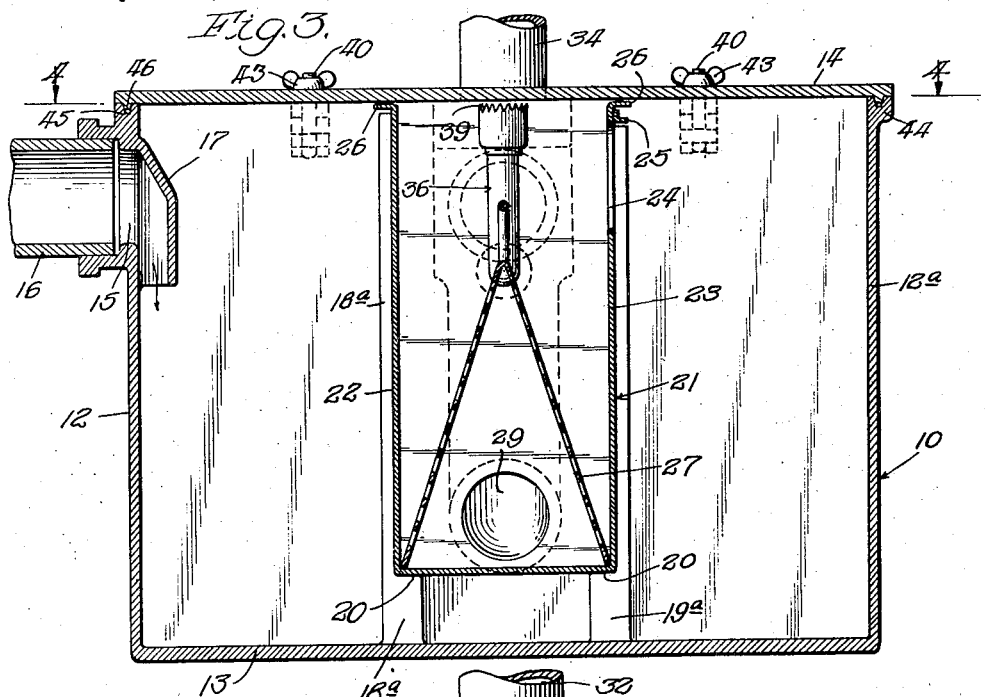
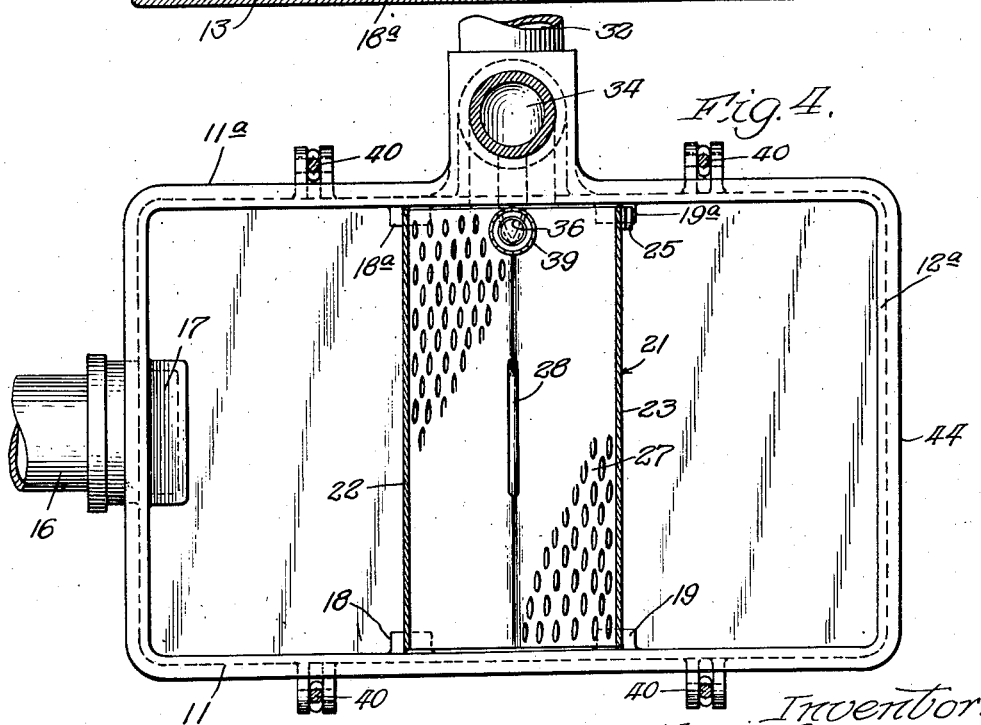
Inventor:
Arthur Gordon, Patented Mar. 22, 1949

2,464,976

UNITED STATES PATENT OFFICE 2,464,976

WASTE TRAP

Arthur Gordon, Chicago, Ill.

Application April 30, 1945, Serial No. 591,104

2 Claims. (Cl. 210—56)

The present invention relates to a waste trap and more particularly to a novel syphon breaker for such a trap.

An object of the invention is to provide a syphon breaker for a waste trap which is positive in action but which will prevent the flow of gases from the sewer to the interior of the trap.

Another object is to provide a removable separating chamber for the trap and means for preventing replacement of the chamber in the trap in any but the correct position.

Other objects, advantages and features of the invention will be apparent from the following specification and drawings, in which:

Fig. 3 is a vertical sectional view taken on the line 3—3 of Fig. 1, and

Fig. 4 is a horizontal sectional view taken on the line 4—4 of Fig. 3.

Figure 1:
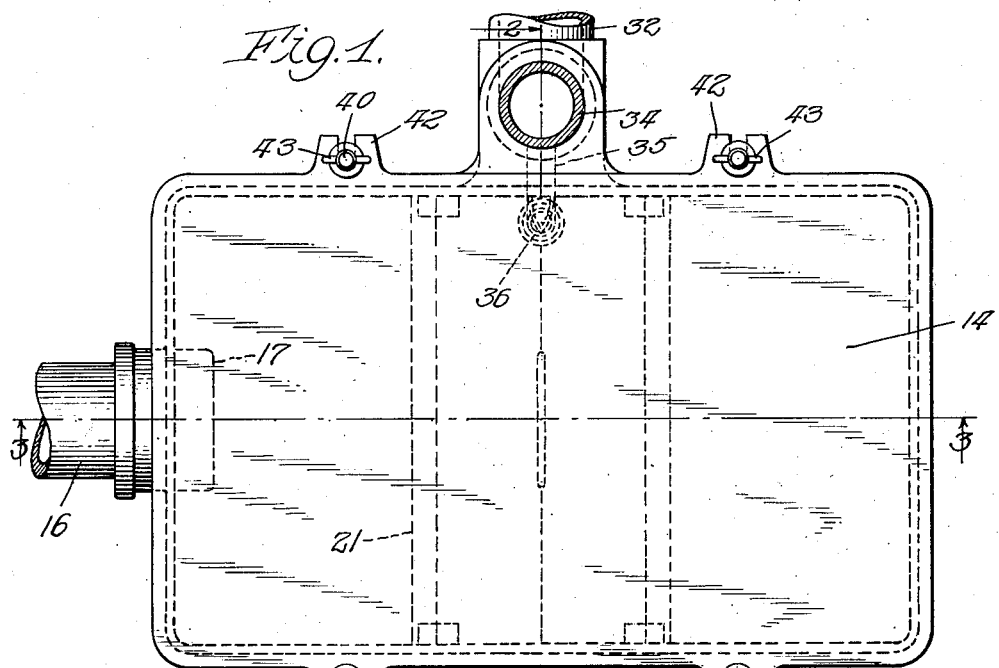
Fig. 1 is a top plan view of a trap embodying the invention.
Figure 2:
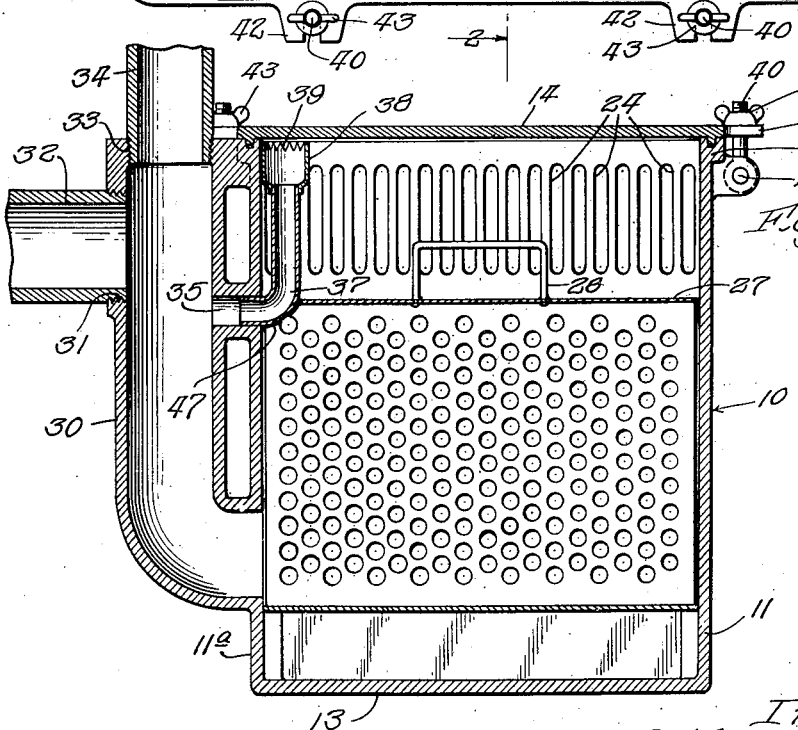
Fig. 2 is a vertical sectional view taken on the line 2—2 of Fig. 1.

In the embodiment of my invention disclosed in the drawings, the trap 10 is shown as being a rectangular casing of metal or other suitable material having sides 11, 11a, end walls 12, 12a, bottom 13 and removable top 14. The trap is provided with a flanged inlet opening 15 to receive the end of a drain pipe 16 leading from a kitchen sink, packing house, beauty parlor or any other establishment where waste water contains fat, grease and other foreign matter which tend to clog a drain. Baffle 17 is provided on the interior of the trap around the opening 15 to direct the waste water downwardly upon its entry into the trap.

The side walls of the trap are each provided with two spaced ribs or brackets 18, 18a and 19, 19a, the rib 19a being of less height than the other ribs, and all having oppositely facing shoulders 20 spaced from the bottom of the trap and adapted to provide a seat or support for the removable separating chamber 21, which is shown as U-shaped and having an imperforate side wall 22 facing the inlet 16, a bottom, and an opposite side wall 23. Slightly below the top of the wall 23 are slotted openings 24, and, on one side above the openings, there is a bracket 25. Both side walls are bent at the top to form flanges 26. The chamber extends transversely of the trap, whereby the side walls of the trap form end walls for the chamber when it is placed in the trap. The chamber is provided with a removable perforated filter plate 27 of inverted V shape, extending the full width of the trap (or length of the chamber) and adapted to be positioned upon the bottom of the chamber, as shown in Fig. 3. A handle 28 is provided on the top of the plate to facilitate its removal from the chamber for cleaning.

An outlet 29 is provided in a side wall of the trap immediately above the central portion of the bottom of the chamber. This outlet communicates with a tubular extension 30 of said side wall. In the upper part of the outer side wall of this extension is a threaded opening 31 adapted to receive the end of a sewer pipe 32. The top of the extension has a threaded opening 33 adapted to receive the end of an air or gas vent 34. The inner side wall is provided with an opening 35, the top of which is below the bottom of the opening 31, and which extends through the side wall of the trap above the outlet 29. The syphon breaker 36, comprising an elbow fitting 37 and removable head 38 having toothed upper edge 39, fits into this opening 35.

On the upper exterior of the trap and extending above the top thereof are four bolts 40 suitably secured in brackets 41. The top 14 is provided with U-shaped flanges 42 adapted to receive the bolts 40. Winged nuts 43 on the bolts 40 fasten the top to the trap.

The side and end walls of the trap are preferably integral and their upper edges are enlarged or flanged at 44 to permit the formation of a groove 45 to receive a bead or projection 46 near the outer edges of the top and thereby provide an efficient seal between the top and sides of the trap. The groove or bead may be provided with felt, rubber, or other suitable material, to increase the efficiency of the seal.

In operation the waste water will enter the trap through inlet 15 and be directed toward the bottom by the baffle, and will flow, under the compartment 21, then upwardly and enter the compartment through the slots 24, then downwardly through the plate 27 where most of the grease and other foreign matter will be deposited and through the outlet and upwardly to the sewer pipe. Any gas formed during the flow through the trap or coming from the sewer will escape through the air vent 34.

As shown in Fig. 3, the inlet 15 is slightly above the outlet 31 to the sewer pipe, so that the water level in the trap will always be above the top of the opening 35 for the syphon breaker. Hence the syphon breaker will always have water in it to form a gas seal to prevent gases flowing back from the sewer into the trap. Such gases will always pass out through the vent 34.

Should, however, syphon action occur, the water in the syphon breaker will be drawn or sucked out of the syphon breaker and followed by air from the interior of the trap which will break the syphon. The toothed top of the syphon breaker prevents the top of the trap from closing the syphon breaker and stopping the flow of air therethrough. Inasmuch as the water in the tubular extension 30 is clarified and contains no solids or other material which would tend to clog an opening, there is no danger of the inlet 35 to the syphon breaker becoming clogged. When in place, however, the cover contacts the top of the teeth on the head to prevent solids entering and clogging up the syphon breaker.

Moreover, should any large gas pressure develop in the compartment, it will blow or force out the water seal in the syphon breaker and escape through the vent 34. Water will immediately return to seal the opening after the gas has escaped.

The cover may be quickly and easily taken off to remove the plate 27 for cleaning the foreign matter caught thereon. This plate is provided with an opening 47 adapted to fit around the syphon breaker and permit the removal of the plate. The enlarged head of the syphon breaker must be removed before the plate is withdrawn from its chamber. The chamber may also be removed from the trap, after removing the elbow joint 37, the flanges 26 providing a handle or grasping means for facilitating this removal. This permits cleaning of both the chamber and the trap when desired.

In order to insure that the chamber is replaced properly in the trap, i. e., so that the openings therein face the end 12a opposite the inlet 15, the bracket 25 is mounted on the perforated side 23 of the chamber and will normally lie just above the top of the short rib or bracket 19a. Should the chamber be placed in the trap in the reverse direction, the bracket will contact a longer rib and the chamber will then extend above the trap, preventing closing of the trap, and warning the user that the chamber should be removed and replaced properly.

The foregoing detailed description is given for clearness of understanding only, and no unnecessary limitations should be understood therefrom, for some modifications will be obvious to those skilled in the art.

What I claim as new, and desire to secure by Letters Patent, is:

1. A waste trap having therein an inlet, an outlet spaced from the inlet, a separator housing comprising side walls and a bottom with the bottom spaced above the bottom of the trap, said inlet communicating with a portion of the trap outside said housing and the outlet communicating with the interior of the housing, and one of said side walls on the side of the housing opposite the inlet being provided with openings so that waste material flowing in the inlet passes under the housing and through the openings into the interior of the housing, and means for removably mounting said housing in proper position in the trap comprising: pairs of ribs on opposite walls of the trap, one rib being shorter than the others, means on said ribs to support the housing, and a bracket near the top of the housing and above the short rib when the housing is in proper position within the trap.

2. A waste trap having therein an inlet, an outlet spaced from the inlet, a separator housing comprising side walls and a bottom with the bottom spaced above the bottom of the trap, said inlet communicating with a portion of the trap outside said housing and the outlet communicating with the interior of the housing, and one of said side walls on the side of the housing opposite the inlet being provided with openings so that waste material flowing in the inlet passes under the housing and through the openings into the interior of the housing, and means for removably mounting said housing in proper position in the trap comprising: pairs of ribs on opposite walls of the trap, one rib being shorter than the others; shoulders on said ribs to support the bottom of the housing; and a bracket mounted on a wall of said housing and adapted to lie above the short rib when the housing is properly placed in the trap but which will contact another rib and prevent the housing from resting on its supports when the housing is improperly placed in the trap.

ARTHUR GORDON.

REFERENCES CITED

The following references are of record in the file of this patent:

UNITED STATES PATENTS

| Number | Name | Date |
| --- | --- | --- |
| 306,981 | Whiting | Oct. 21, 1884 |
| 1,970,123 | Boosey | Aug. 14, 1934 |
| 2,059,844 | Boosey | Nov. 3, 1936 |
| 2,070,202 | Gordon | Feb. 9, 1937 |
| 2,103,316 | Boosey | Dec. 28, 1937 |
| 2,324,190 | Boosey | July 13, 1943 |
| 2,362,447 | Boosey | Nov. 14, 1944 |